US012214985B2

(12) United States Patent
Komazawa

(10) Patent No.: US 12,214,985 B2
(45) Date of Patent: Feb. 4, 2025

(54) MEDIUM PROCESSING APPARATUS, INFORMATION PROCESSING APPARATUS, AND NON-TRANSITORY COMPUTER READABLE MEDIUM STORING PROGRAM

(71) Applicant: FUJIFILM Business Innovation Corp., Tokyo (JP)

(72) Inventor: Hisao Komazawa, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 672 days.

(21) Appl. No.: 17/322,858

(22) Filed: May 17, 2021

(65) Prior Publication Data

US 2022/0106149 A1 Apr. 7, 2022

(30) Foreign Application Priority Data

Oct. 1, 2020 (JP) ................................ 2020-167265

(51) Int. Cl.

*B65H 33/04* (2006.01)
*B41J 13/00* (2006.01)
*B65H 39/042* (2006.01)

(52) U.S. Cl.

CPC ........ *B65H 39/042* (2013.01); *B41J 13/0009* (2013.01)

(58) Field of Classification Search

CPC ............ B65H 33/04; B65H 2301/4318; B65H 2701/11132; G03G 2215/00894; G03G 2215/00523; G03G 15/655
USPC ............................ 270/58.31, 58.32; 399/382
See application file for complete search history.

(56) References Cited

U.S. PATENT DOCUMENTS

| | | | | |
|---|---|---|---|---|
| 5,839,045 A * | 11/1998 | Wierszewski | G03G 15/655 399/397 |
| 7,980,545 B2 * | 7/2011 | Yokomizo | B65H 33/04 270/58.23 |
| 8,100,392 B2 * | 1/2012 | Shinchi | G03G 15/655 399/382 |
| 8,205,868 B2 * | 6/2012 | Kubota | G03G 15/2032 700/223 |

(Continued)

FOREIGN PATENT DOCUMENTS

| | | |
|---|---|---|
| JP | 2011118564 | 6/2011 |
| JP | 2014019578 | 2/2014 |
| JP | 2019008116 | 1/2019 |

OTHER PUBLICATIONS

"Office Action of Japan Counterpart Application", issued on Jul. 30, 2024, with English translation thereof, p. 1-p. 6.

*Primary Examiner* — Patrick H Mackey
(74) *Attorney, Agent, or Firm* — JCIPRNET

(57) ABSTRACT

A medium processing apparatus includes a first medium support portion that supports a printing medium bundle consisting of printed media on which printing has been performed and an insertion medium inserted between the printed media, a second medium support portion that supports an insertion medium bundle including plural insertion media, and a supply unit that supplies a corresponding insertion medium from the insertion medium bundle to a place where the insertion medium is missing in the printing medium bundle and does not supply an insertion medium corresponding to the insertion medium included in the printing medium bundle among the insertion media included in the insertion medium bundle to the printing medium bundle.

13 Claims, 9 Drawing Sheets

(56) References Cited

U.S. PATENT DOCUMENTS

| | | | | |
|---|---|---|---|---|
| 8,448,932 | B2 | 5/2013 | Kubota | |
| 8,737,902 | B2 * | 5/2014 | Igarashi | G03G 15/655 399/382 |
| 11,016,429 | B2 * | 5/2021 | Ando | G03G 15/655 |
| 2012/0286042 | A1 * | 11/2012 | Sawano | G03G 15/5062 235/437 |

* cited by examiner

MEDIUM PROCESSING APPARATUS, INFORMATION PROCESSING APPARATUS, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2020-167265 filed Oct. 1, 2020.

BACKGROUND

(i) Technical Field

The present invention relates to a medium processing apparatus, an information processing apparatus, and a non-transitory computer readable medium storing a program.

(ii) Related Art

JP2019-008116A discloses a configuration in which a discharge medium can be discharged separately from a transfer medium discharged at a normal output of a job and the discharge medium can be supplied to a transfer medium supply portion different from a transfer medium supply portion used for the job output.

JP2014-019578A discloses an apparatus including a plurality of paper feeding units that feed different types of index paper with a plurality of sheets as one set and a switching unit that sequentially selects a plurality of sheets of index paper having different tab positions from each paper feeding unit to switch each paper feeding unit such that the selected index paper is inserted between printed matter and printed matter.

SUMMARY

In a case where a part of insertion media is missing in generating a printing medium bundle consisting of printed media on which printing has been performed and the insertion medium inserted between the printed media, the part of the insertion media is replenished to complete the printing medium bundle.

In a case where the insertion medium is supplied to the printing medium bundle in order from an insertion medium bundle including a set of insertion media in replenishing the insertion medium, the printing medium bundle may also include the insertion medium that does not need to be replenished.

To avoid this, a user may select and set the insertion medium for the replenishment in the apparatus, for example. However, only the selection and setting of the insertion medium by the user may generate the printing medium bundle with a different arrangement order of the insertion media.

Aspects of non-limiting embodiments of the present disclosure relate to a medium processing apparatus, an information processing apparatus, and a non-transitory computer readable medium storing a program, for appropriately replenishing an insertion medium to a printing medium bundle with an omitted insertion medium, as compared with a case where the insertion medium is supplied in order from an insertion medium bundle including a set of insertion media to replenish the insertion medium.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a medium processing apparatus including a first medium support portion that supports a printing medium bundle consisting of printed media on which printing has been performed and an insertion medium inserted between the printed media, a second medium support portion that supports an insertion medium bundle consisting of a plurality of the insertion media, and a supply unit that supplies a corresponding insertion medium from the insertion medium bundle to a place where the insertion medium is missing in the printing medium bundle and does not supply an insertion medium corresponding to the insertion medium included in the printing medium bundle among the insertion media included in the insertion medium bundle to the printing medium bundle.

BRIEF DESCRIPTION OF THE DRAWINGS

Exemplary embodiment(s) of the present invention will be described in detail based on the following figures, wherein.

Figure 6:
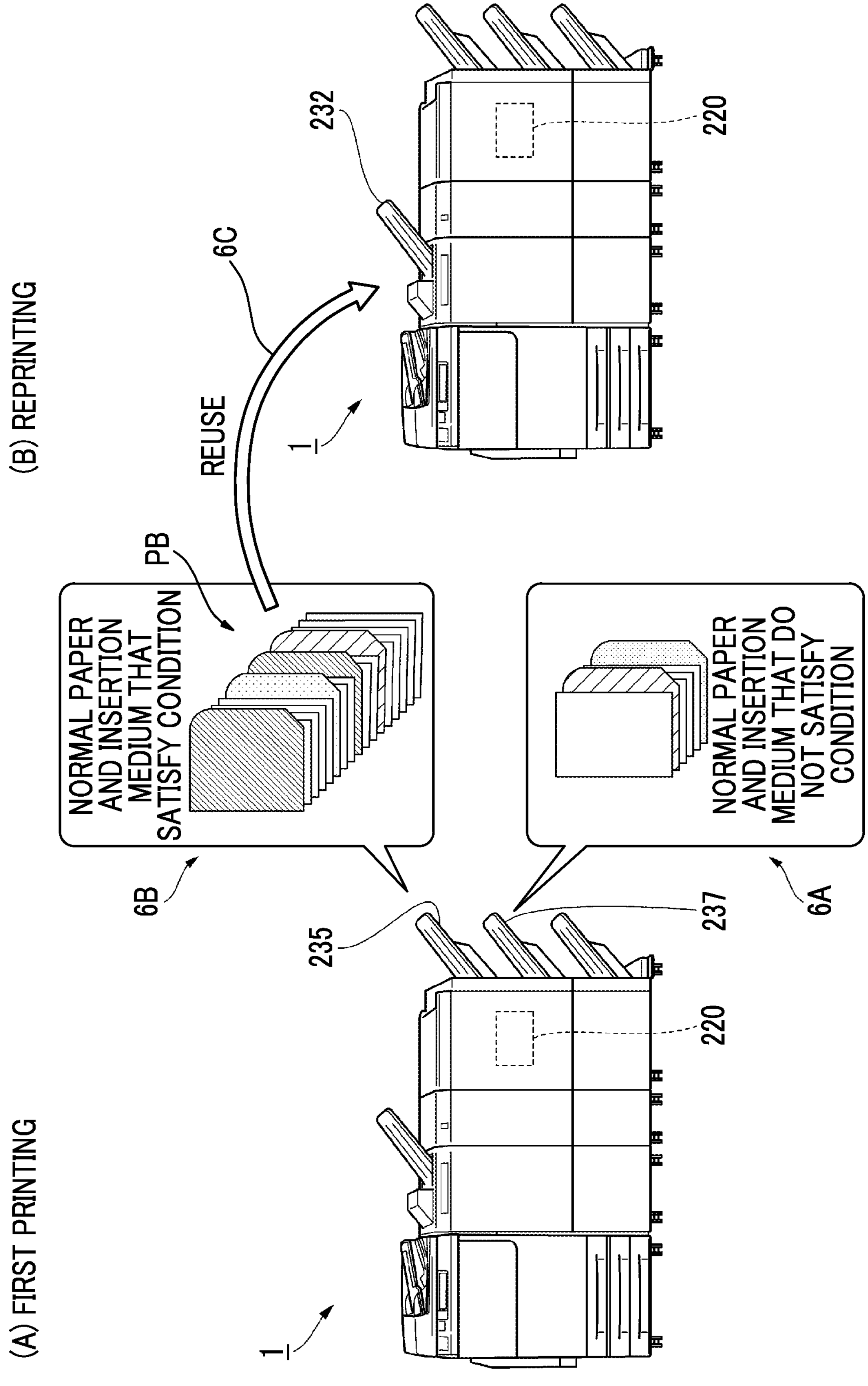
Figure 7:
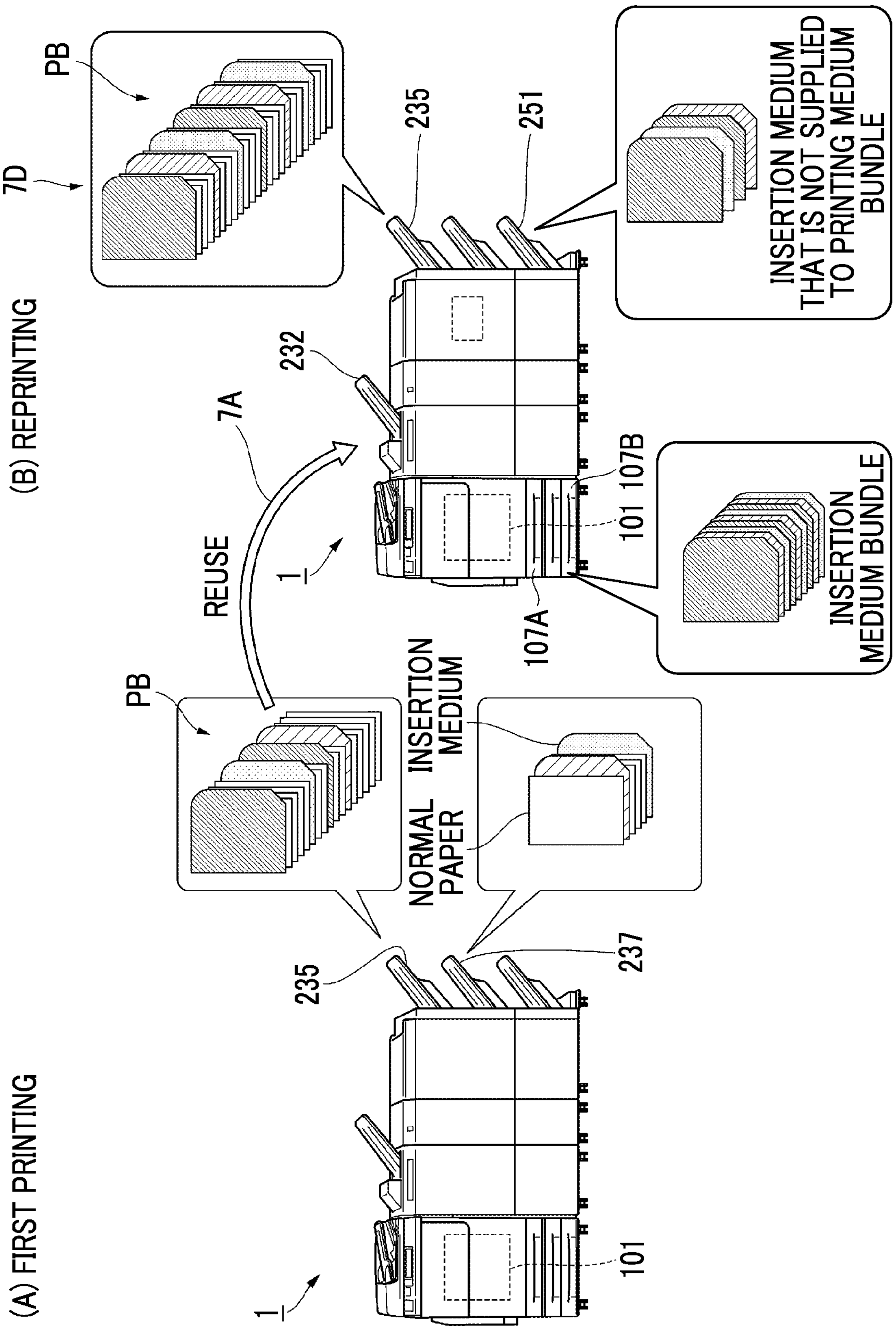
Figure 8:
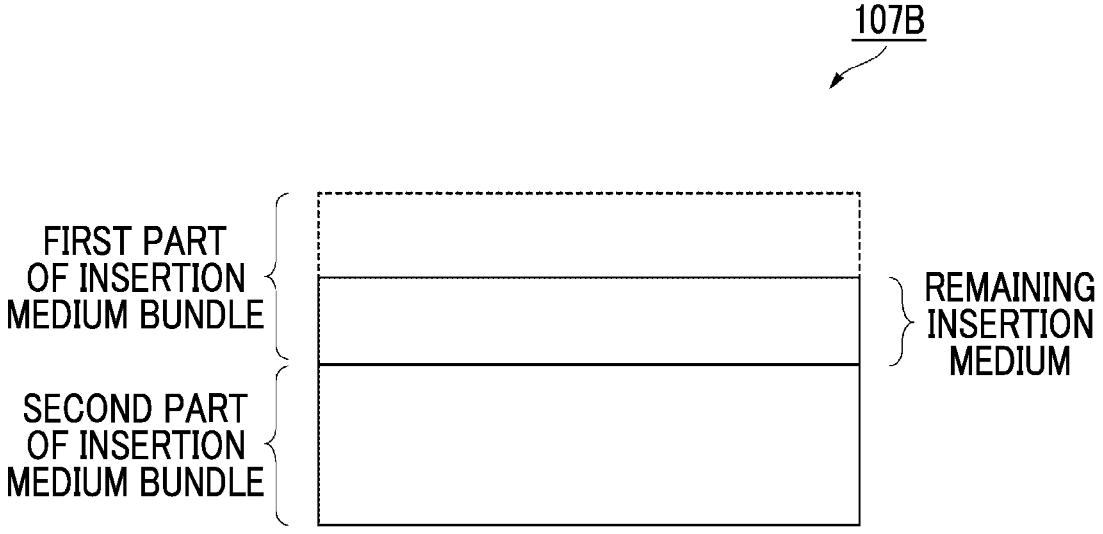
Figure 9:
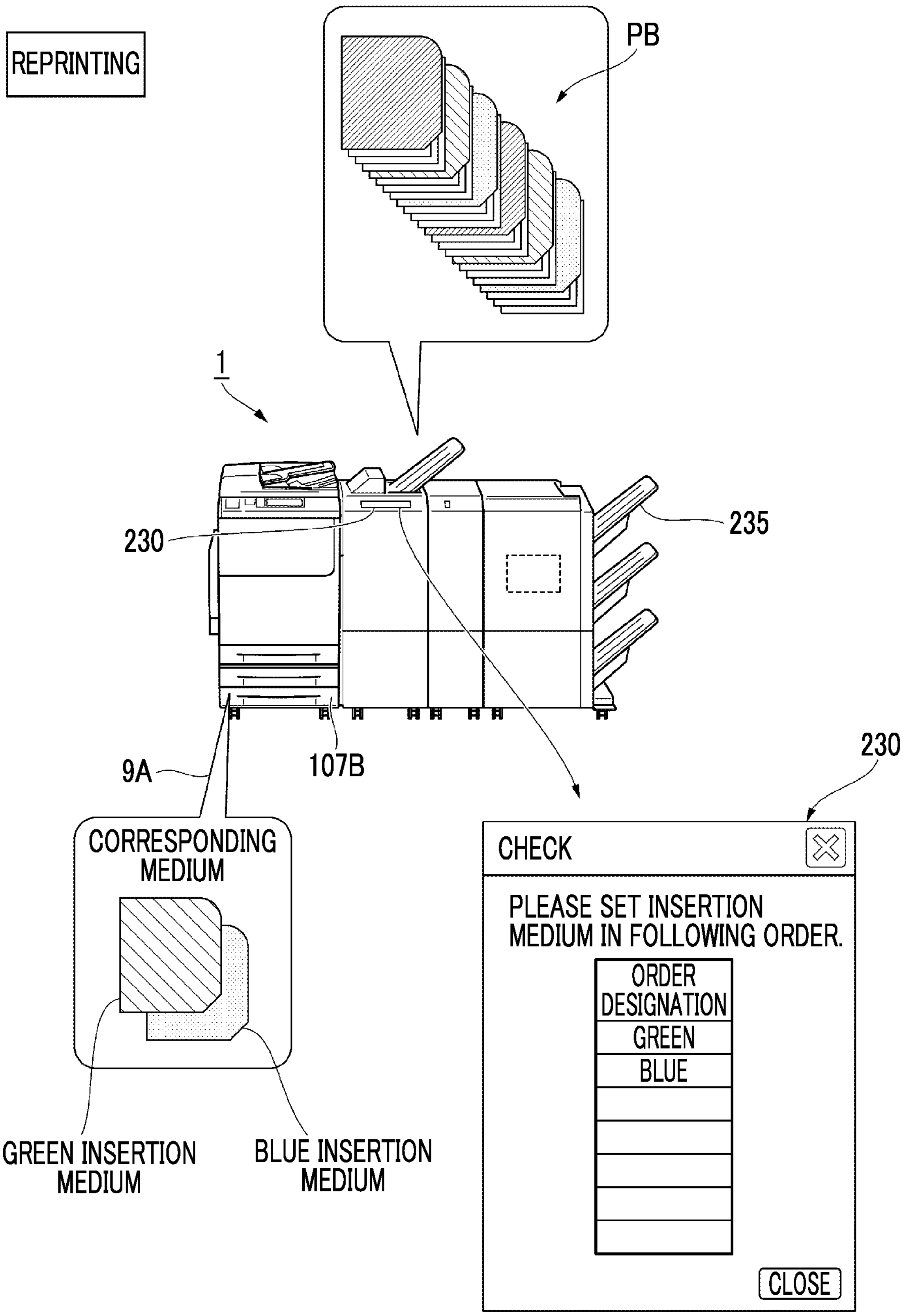

(A) and (B) of FIG. 6 are diagrams showing an example of another state of the image forming system after the processing in the image forming system ends;

(A) and (B) of FIG. 7 are diagrams describing reprinting;

FIG. 8 is a diagram showing a state of a plurality of parts of insertion medium; and FIG. 9 is a diagram describing a display on a display apparatus.

DETAILED DESCRIPTION

Hereinafter, exemplary embodiments of the present invention will be described in detail with reference to accompanying drawings.

First Exemplary Embodiment

Figure 1:
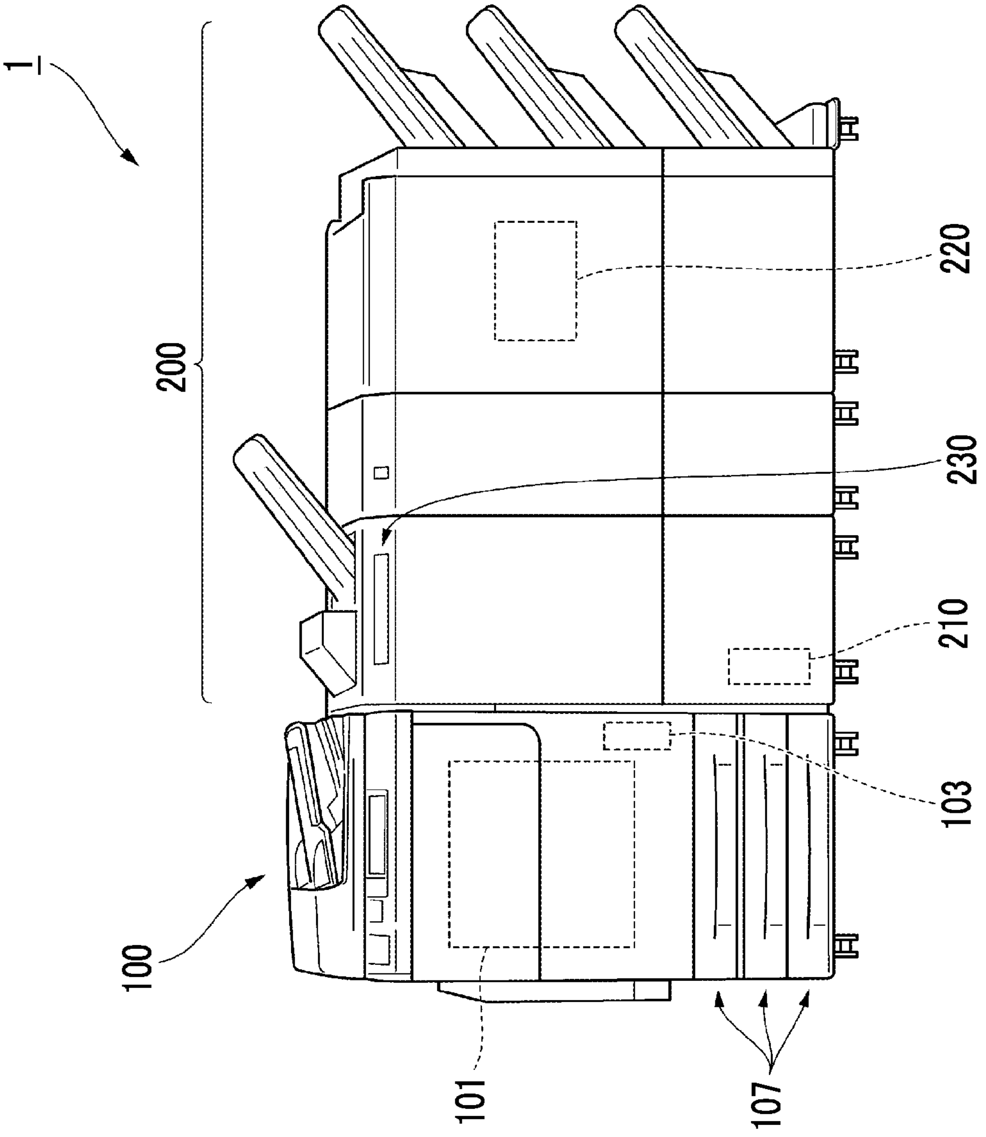
FIG. 1 is a diagram showing an image forming system.

FIG. 1 is a diagram showing an image forming system 1 according to the present exemplary embodiment.

The image forming system 1 is provided with an image forming apparatus 100 that forms an image on paper, which is an example of a recording medium. The image forming system 1 is provided with a paper processing apparatus 200 that processes the paper on which the image is formed by the image forming apparatus 100.

The image forming system 1 can also be regarded as a medium processing apparatus that performs processing on the recording medium such as paper.

In the present exemplary embodiment, in a case where image data is input to the image forming system 1 from the outside, an image is formed on paper based on the image data and the processing is performed on the paper on which the image is formed.

The image forming apparatus 100 is provided with an image forming control unit 103. The image forming apparatus 100 is provided with a plurality of accommodation portions 107 that accommodates the paper and an insertion medium (described below).

The image forming apparatus 100 is provided with an image forming unit 101 that forms the image on the paper sent out from the accommodation portion 107 and the insertion medium sent out from the accommodation portion 107.

The image forming unit 101 uses, for example, an electrophotographic method to forma toner image corresponding to the image data on the paper and the insertion medium. The image forming unit 101 may use another method such as an inkjet head method to form the image on the paper and the insertion medium.

The image forming control unit 103 controls each part of the image forming apparatus 100.

Figure 2:
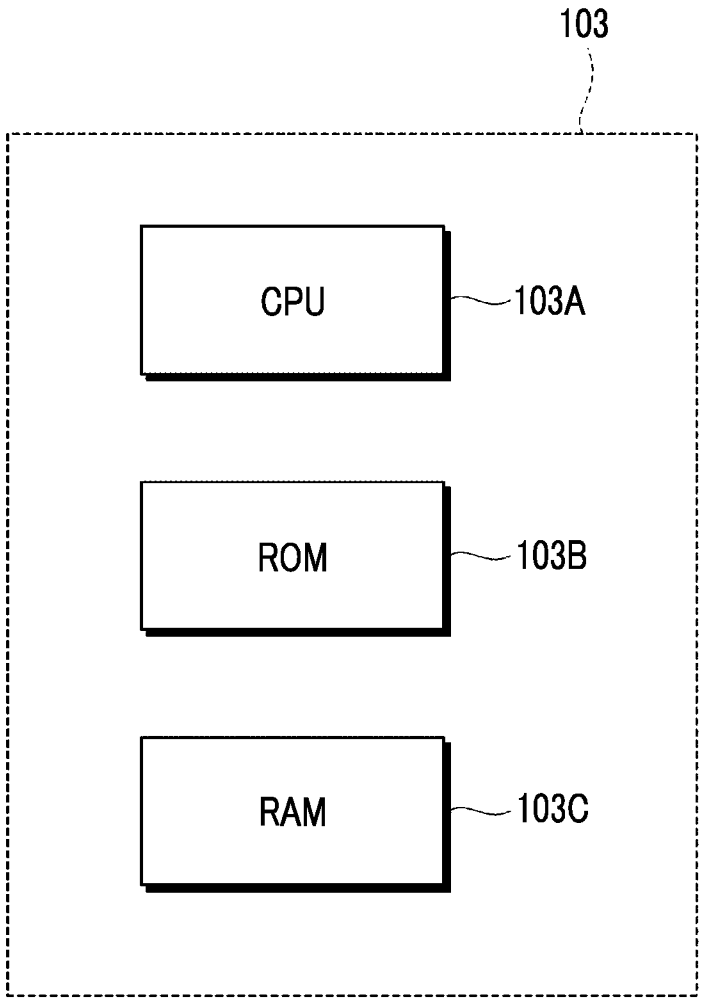
FIG. 2 is a diagram showing a configuration of an image forming control unit.

FIG. 2 is a diagram showing a configuration of the image forming control unit 103.

The image forming control unit 103 is configured of a central processing unit (CPU) 103A as an example of a processor, a read only memory (ROM) 103B, and a random access memory (RAM) 103C.

The ROM 103B stores a program executed by the CPU 103A. The CPU 103A reads the program stored in the ROM 103B and executes the program with the RAM 103C as a work area. The image forming control unit 103 is a so-called computer.

The program executed by the CPU 103A may be provided to the image forming control unit 103 in a state of being stored in a computer readable recording medium such as a magnetic recording medium (magnetic tape, magnetic disk, or the like), an optical recording medium (optical disk, or the like), an optical magnetic recording medium, or a semiconductor memory.

The program executed by the CPU 103A may be downloaded to the image forming control unit 103 by using a communication unit such as the Internet.

A plurality of paper processing units (not shown), a paper processing control unit 210, and an inspection apparatus 220 are provided inside the paper processing apparatus 200 (refer to FIG. 1).

The paper processing apparatus 200 is provided with a display apparatus 230 configured of a liquid crystal display, an organic EL display, or the like.

Each of the paper processing units performs hole punching processing on the paper, paper binding processing, paper folding processing, and the like. The paper processing control unit 210 controls each part of the paper processing apparatus 200. The inspection apparatus 220 inspects the paper and the insertion medium.

The paper processing apparatus 200 may perform only the inspection by the inspection apparatus 220 without performing the processing such as the hole punching processing, the binding processing, and the folding processing.

In other words, the paper processing apparatus 200 may use the inspection apparatus 220 to perform only the inspection of the paper and the insertion medium conveyed from the image forming apparatus 100.

The inspection apparatus 220 compares, for example, a pre-registered reference image with an image actually formed on the paper and the insertion medium to inspect whether or not a stain occurs, for example.

Figure 3:
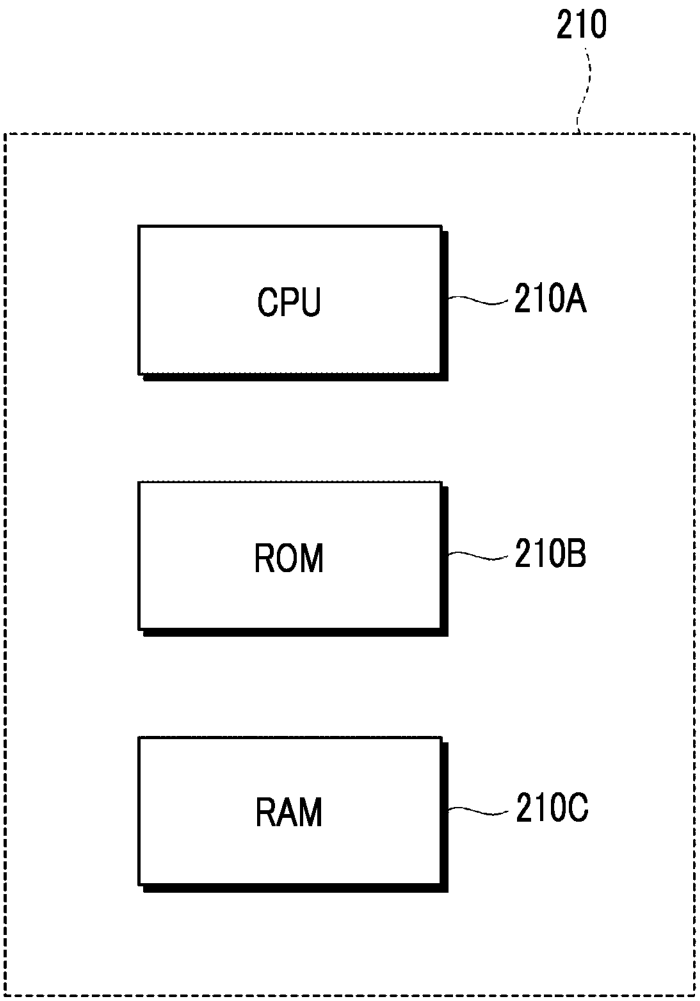
FIG. 3 is a diagram showing a configuration example of hardware of a paper processing control unit.

FIG. 3 is a diagram showing a configuration example of hardware of the paper processing control unit 210.

The paper processing control unit 210 is configured of a central processing unit (CPU) 210A as an example of a processor, a read only memory (ROM) 210B, and a random access memory (RAM) 210C.

The ROM 210B stores a program executed by the CPU 210A. The CPU 210A reads the program stored in the ROM 210B and executes the program with the RAM 210C as a work area. The paper processing control unit 210 is a so-called computer.

In the present exemplary embodiment, the CPU 210A executes the program stored in the ROM 210B or the like to execute processing described below.

The program executed by the CPU 210A may be provided to the paper processing control unit 210 in a state of being stored in a computer readable recording medium such as a magnetic recording medium (magnetic tape, magnetic disk, or the like), an optical recording medium (optical disk, or the like), an optical magnetic recording medium, or a semiconductor memory.

The program executed by the CPU 210A may be provided to the paper processing control unit 210 by using a communication unit such as the Internet.

The paper processing control unit 210 can be regarded as an information processing apparatus that processes information about a medium.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

Figure 4:
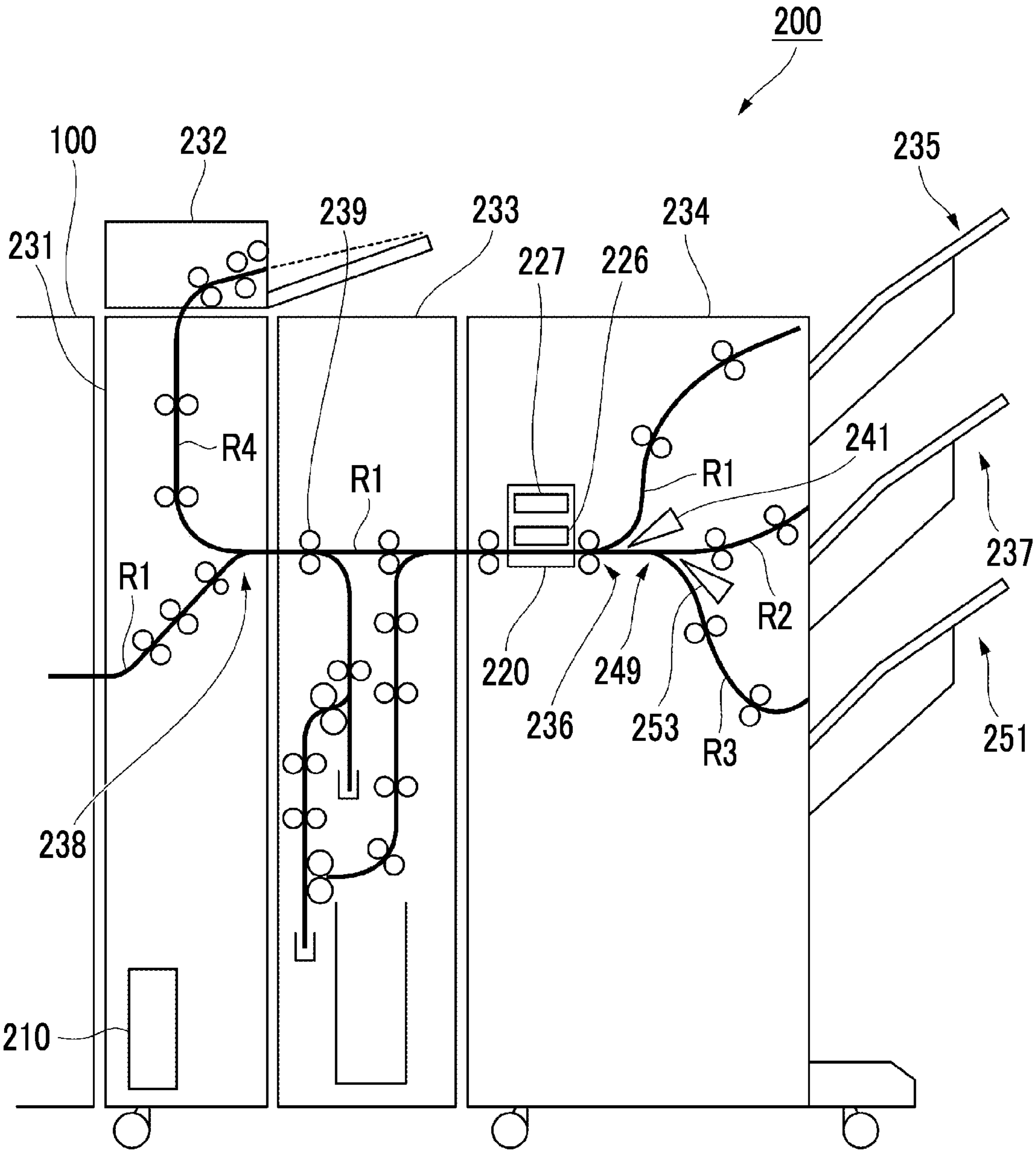
FIG. 4 is a diagram describing a paper processing apparatus.

FIG. 4 is a diagram describing the paper processing apparatus 200.

The paper processing apparatus 200 is provided with a transport unit 231 that sends out the paper and the insertion medium conveyed from the image forming apparatus 100 to a downstream side.

A paper feeding apparatus 232 that feeds the paper and the insertion medium included in a printing medium bundle described below into the transport unit 231 is provided above the transport unit 231.

The paper processing apparatus 200 is provided with a folding unit 233 that performs folding processing on the paper sent from the transport unit 231 as necessary.

An inspection unit 234 that inspects the paper and the insertion medium is provided on a downstream side of the folding unit 233.

Although not shown, the paper processing unit that performs the hole punching processing, the binding processing, and the like on the paper is provided in the paper processing apparatus 200.

The paper processing apparatus 200 is provided with a first paper path R1 through which the paper from the image forming apparatus 100 passes. The first paper path R1 extends from the transport unit 231 to a first paper stacking portion 235 provided in the inspection unit 234.

In the present exemplary embodiment, the paper and the insertion medium conveyed through the first paper path R1 are stacked on the first paper stacking portion 235, and the paper and the insertion medium are supported from below by the first paper stacking portion 235.

In the present exemplary embodiment, the inspection apparatus 220 is provided in the inspection unit 234. The inspection apparatus 220 inspects the paper and the insertion medium passing through the first paper path R1.

The inspection apparatus 220 has an image scanning unit 226 that scans the image formed on the paper and the insertion medium passing through the inspection apparatus 220, and a determination unit 227.

The image scanning unit 226 is configured of, for example, a so-called scanner apparatus including an imaging element such as a CCD. The determination unit 227 is configured of a computer apparatus including a CPU as an example of the processor.

The determination unit 227 compares the pre-registered reference image with the image actually formed on the paper and the insertion medium and scanned by the image scanning unit 226 to inspect whether or not a stain occurs or the like.

In the present exemplary embodiment, a second paper path R2 branching from the first paper path R1 is provided on a downstream side of the inspection apparatus 220 in a paper conveyance direction in the first paper path R1.

The second paper path R2 branches from the first paper path R1 at a first branch portion 236 and extends to a second paper stacking portion 237.

In the present exemplary embodiment, the paper and the insertion medium conveyed through the second paper path R2 are stacked on the second paper stacking portion 237, and the paper and the insertion medium are supported from below by the second paper stacking portion 237.

In the present exemplary embodiment, a third paper path R3 branched from the second paper path R2 is provided. The third paper path R3 branches from the second paper path R2 at a second branch portion 249 and extends to a third paper stacking portion 251.

The second branch portion 249 is located on a downstream side of the first branch portion 236 in a paper conveyance direction in the second paper path R2.

In the present exemplary embodiment, the insertion medium conveyed through the third paper path R3 is stacked on the third paper stacking portion 251, and the insertion medium is supported from below.

In the present exemplary embodiment, a merging path R4 that merges with the first paper path R1 at a merging portion 238 is provided toward the first paper path R1 from the paper feeding apparatus 232.

In the present exemplary embodiment, the merging portion 238 is located on an upstream side of the inspection apparatus 220 in the paper conveyance direction and the insertion medium in the first paper path R1.

The paper and the insertion medium supplied from the paper feeding apparatus 232 are supplied to the first paper path R1 through the merging path R4 and then heads toward the first paper stacking portion 235 or the like.

In the present exemplary embodiment, a conveyance roll 239 is provided as an example of a conveyance member, which is provided at each of the first paper path R1, the second paper path R2, the third paper path R3, and the merging path R4 and conveys the paper and the insertion medium on the paths to the downstream side.

A first switching member 241 in which a conveyance destination of the paper and the insertion medium that have reached the first branch portion 236 through the first paper path R1 is set to any one of the first paper stacking portion 235 or the second branch portion 249 is provided at the first branch portion 236.

A second switching member 253 in which a conveyance destination of the paper and the insertion medium that have reached the second branch portion 249 through the second paper path R2 is set to any one of the second paper stacking portion 237 or the third paper stacking portion 251 is provided at the second branch portion 249.

In the present exemplary embodiment, the first switching member 241 is driven by the paper processing control unit 210, and the paper and the insertion medium that have reached the first branch portion 236 through the first paper path R1 head toward any one of the first paper stacking portion 235 or the second branch portion 249.

In the present exemplary embodiment, the second switching member 253 is driven by the paper processing control unit 210, and the paper and the insertion medium that have reached the second branch portion 249 through the second paper path R2 head toward any one of the second paper stacking portion 237 or the third paper stacking portion 251.

Figure 5:
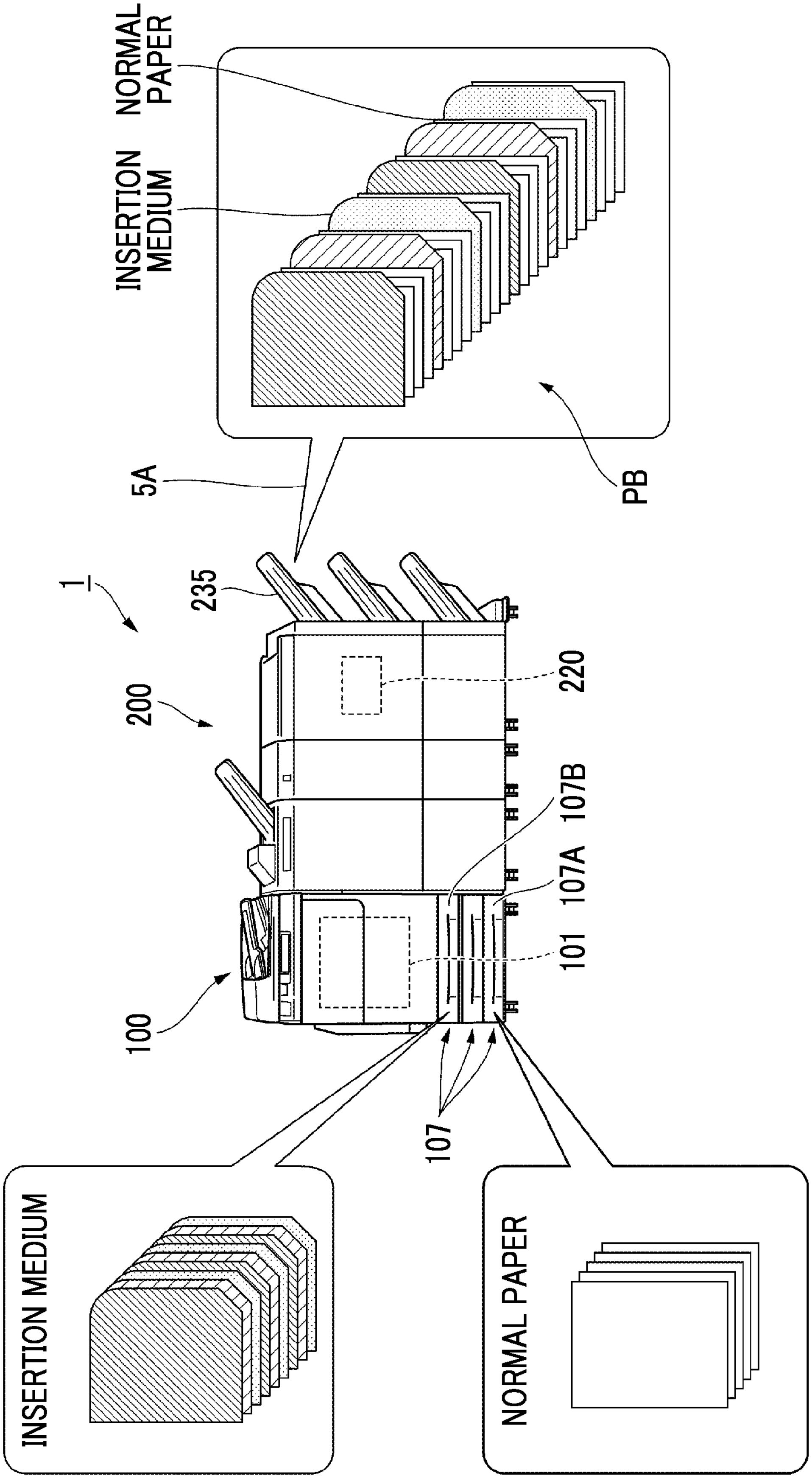
FIG. 5 is a diagram describing processing executed by the image forming system.

Basic processing executed by the image forming system 1 of the present exemplary embodiment will be described with reference to FIG. 5 (a diagram describing the processing executed by the image forming system 1).

In the present exemplary embodiment, as described above, the image forming apparatus 100 is provided with the plurality of accommodation portions 107, and one accommodation portion 107 of the plurality of accommodation portions 107 accommodates normal white paper (hereinafter, referred to as "normal paper"). Another accommodation portion 107 accommodates the insertion medium inserted between sheets of normal paper.

In the present exemplary embodiment, printing is performed on each sheet of normal paper by the image forming unit 101, and a plurality of sheets of normal paper on which the printing has been performed are generated.

The insertion medium accommodated in another accommodation portion 107 is inserted between the plurality of sheets of normal paper on which the printing has been performed.

The another accommodation portion 107 accommodates an insertion medium bundle consisting of a plurality of types of insertion media.

One insertion medium bundle is configured of a predetermined number of insertion media, and the insertion media are arranged in a predetermined order in this one insertion medium bundle.

The another accommodation portion 107 can accommodate a plurality of parts of insertion medium bundle.

A color, a shape, and a material of each of the insertion media configuring one insertion medium bundle are not particularly limited. In general, the insertion medium is made of paper, but may be made of a material other than paper, such as a resin film.

The shape of the insertion medium is not particularly limited. An example of a basic shape of the insertion medium includes a rectangular shape.

Another example of the shape of the insertion medium includes a shape in which a part of an outer peripheral edge of the insertion medium protrudes from other parts thereof. The insertion medium having the shape in which a part of the outer peripheral edge protrudes from other parts thereof has a function as so-called tab paper.

The insertion medium is generally inserted into a break (separation) between the parts in the printing to play a role of clarifying the separation between the parts.

Hereinafter, in the present specification, the accommodation portion 107 that accommodates the normal paper, among the plurality of accommodation portions 107 provided in the image forming apparatus 100, is referred to as a paper accommodation portion 107A. The accommodation portion 107 that accommodates the insertion medium is referred to as a medium accommodation portion 107B.

In the present exemplary embodiment, the normal paper is sequentially sent out from the paper accommodation portion 107A, and the normal paper heads toward the paper processing apparatus 200 through the image forming unit 101.

In the present exemplary embodiment, in a case where the normal paper of a predetermined page is sent out, the insertion medium inserted between the normal paper of the predetermined page and the normal paper of a next page is sent out from the medium accommodation portion 107B.

Accordingly, the insertion medium is inserted between the normal paper of the predetermined page and the normal paper of the next page. The insertion medium also heads toward the paper processing apparatus 200 through the image forming unit 101.

In the present exemplary embodiment, in a case where an inspection result by the inspection apparatus 220 on each of the normal paper and the insertion medium satisfies a predetermined condition, each of the normal paper and the insertion medium is conveyed to the first paper stacking portion 235. In other words, each of the normal paper and the insertion medium is conveyed to the first paper stacking portion 235 in a case where the inspection apparatus 220 determines that no image defect has occurred.

In the present exemplary embodiment, the processing of sending out the normal paper and the insertion medium is sequentially performed.

In a case where one printing job ends and all of the normal paper and the insertion medium satisfy the predetermined condition, these normal paper and insertion medium are stacked on the first paper stacking portion 235 as indicated by a reference numeral 5A.

In other words, in a case where the one printing job ends, there is a state where a paper bundle in which the insertion medium is inserted between the sheets of normal paper (hereinafter, referred to as "printing medium bundle PB") is stacked on the first paper stacking portion 235.

As described above, the medium accommodation portion 107B accommodates the insertion medium bundle in which the insertion media are arranged in the predetermined order. In the present exemplary embodiment, one insertion medium bundle is used to generate one part of the printing medium bundle PB.

In other words, in the present exemplary embodiment, one insertion medium bundle is prepared in advance for each printing medium bundle PB to generate the printing medium bundle PB.

In the present exemplary embodiment, in a case where the insertion medium bundle is accommodated in the medium accommodation portion 107B, the insertion medium is accommodated in the medium accommodation portion 107B in units of the insertion medium bundles.

In the present exemplary embodiment, the medium accommodation portion 107B can accommodate the plurality of parts of insertion medium bundle.

(A) and (B) of FIG. 6 are diagrams showing an example of another state of the image forming system 1 after the processing in the image forming system 1 ends.

In the present exemplary embodiment, each of the normal paper and the insertion medium is inspected by the inspection apparatus 220 in a case of passing through the inspection apparatus 220 (refer to (A) of FIG. 6).

In the present exemplary embodiment, the normal paper and the insertion medium that do not satisfy the predetermined condition as a result of the inspection are conveyed to the second paper stacking portion 237.

Accordingly, in the present exemplary embodiment, the normal paper and the insertion medium that do not satisfy the predetermined condition are stacked on the second paper stacking portion 237 as indicated by a reference numeral 6A.

On the other hand, in the present exemplary embodiment, the normal paper and the insertion medium that satisfy the predetermined condition are stacked on the first paper stacking portion 235 as indicated by a reference numeral 6B.

Accordingly, in the present exemplary embodiment, the normal paper and the insertion medium that do not satisfy the predetermined condition are separated from the normal paper and the insertion medium that satisfy the predetermined condition.

In other words, in the present exemplary embodiment, the normal paper and the insertion medium on which printing defects have occurred are separated from the normal paper and the insertion medium on which the printing has been ended normally.

In the present exemplary embodiment, in a case where the normal paper and the insertion medium are stacked on the second paper stacking portion 237, reprinting is performed as shown in (B) of FIG. 6.

In this reprinting, the printing medium bundle PB stacked on the first paper stacking portion 235 is set in the paper feeding apparatus 232 as indicated by a reference numeral 6C.

In a state where the normal paper and the insertion medium are stacked on the second paper stacking portion 237, there is a state where the normal paper and the insertion medium are missing in the printing medium bundle PB consisting of the normal paper and the insertion medium on which the printing has been ended normally.

Therefore, in the present exemplary embodiment, in a case where the normal paper and the insertion medium are stacked on the second paper stacking portion 237, the reprinting is performed.

(A) and (B) of FIG. 7 are diagrams describing the reprinting. (A) of FIG. 7 shows the same state as shown in (A) of FIG. 6.

In a case where the reprinting is performed, the printing medium bundle PB stacked on the first paper stacking portion 235 is set in the paper feeding apparatus 232 as indicated by a reference numeral 7A in (B) of FIG. 7.

In first printing (first printing performed before the reprinting), the printing medium bundle PB consisting of the normal paper, as an example of a printed medium on which the printing has been performed normally, and the insertion medium, which is inserted between the sheets of normal paper and on which the printing has been performed normally, is placed on the first paper stacking portion 235.

In the reprinting, the printing medium bundle PB on the first paper stacking portion 235 is set in the paper feeding apparatus 232 as an example of a first medium support portion, and is supported by the paper feeding apparatus 232. This printing medium bundle PB can be reused and thus is set in the paper feeding apparatus 232 for the reuse without being discarded.

The normal paper and the insertion medium stacked on the second paper stacking portion 237 (refer to (A) of FIG. 7) are discarded in performing the reprinting.

The printing defects have occurred in the normal paper and the insertion medium stacked on the second paper stacking portion 237, and the normal paper and the insertion medium stacked on the second paper stacking portion 237 are discarded without being reused.

In the first printing (first printing performed before the reprinting), the "printing medium bundle PB" generated on the first paper stacking portion 235 may include an unprinted medium. Specifically, the "printing medium bundle PB" may include unprinted normal paper and insertion medium.

That is, in the present exemplary embodiment, even a bundle including the unprinted normal paper and insertion medium falls under the category of "printing medium bundle PB".

In the present exemplary embodiment, the printing medium bundle PB is set in the paper feeding apparatus 232 (refer to (B) of FIG. 7), and then the reprinting is started in response to an instruction from the user.

In this reprinting, a corresponding medium, which is an insertion medium corresponding to a missing insertion medium, is supplied to a place where the insertion medium is missing in the printing medium bundle PB set in the paper feeding apparatus 232 from the insertion medium bundle (new insertion medium bundle) in the medium accommodation portion 107B.

This supply of the corresponding medium is performed by a supply mechanism as an example of a supply unit.

The supply mechanism is configured of the CPU 210A (refer to FIG. 3) as an example of the processor and a conveyance mechanism, such as the conveyance roll 239 (refer to FIG. 4) provided in the image forming system 1, that conveys the normal paper and the insertion medium.

The CPU 210A controls the conveyance mechanism in cooperation with the CPU 103A (refer to FIG. 2) provided in the image forming control unit 103 of the image forming apparatus 100 to supply the corresponding medium corresponding to the missing insertion medium.

The supply mechanism not only supplies the corresponding medium to the printing medium bundle PB, but also supplies the normal paper to the printing medium bundle PB.

Specifically, the supply mechanism supplies the normal paper to the place where the normal paper is missing in the printing medium bundle PB set in the paper feeding apparatus 232 (refer to (B) of FIG. 7).

More specifically, the supply mechanism supplies new normal paper, which is in the paper accommodation portion 107A and on which the printing has been performed by the image forming unit 101, to the place where the normal paper is missing in the printing medium bundle PB.

More specifically, the supply mechanism supplies the new normal paper on which an image that is scheduled to be formed on the normal paper is formed to the place where the normal paper is missing in the printing medium bundle PB set in the paper feeding apparatus 232.

Accordingly, in the present exemplary embodiment, the printing medium bundle PB in which the missing insertion medium and the missing normal paper are replenished is generated on the first paper stacking portion 235 as indicated by a reference numeral 7D in (B) of FIG. 7.

The supply mechanism does not perform the supply to the printing medium bundle PB for an insertion medium corresponding to the insertion medium included in the printing medium bundle PB set in the paper feeding apparatus 232 among the insertion media included in the insertion medium bundle (new insertion medium bundle) in the medium accommodation portion 107B (refer to (B) of FIG. 7).

In other words, the supply mechanism does not perform the conveyance to the first paper stacking portion 235 for the insertion medium corresponding to the insertion medium already included in the printing medium bundle PB.

The supply mechanism conveys the insertion medium that is not supplied to the printing medium bundle PB from the medium accommodation portion 107B (refer to (B) of FIG. 7) (an example of a second medium support portion) to the third paper stacking portion 251.

On the other hand, the supply mechanism performs the supply to the printing medium bundle PB for the corresponding medium corresponding to the missing insertion medium in the printing medium bundle PB set in the paper feeding apparatus 232.

Specifically, the supply mechanism performs the supply of the corresponding medium in a case where each of the normal paper and the insertion medium included in the printing medium bundle PB is conveyed from the paper feeding apparatus 232 (refer to (B) of FIG. 7) to the first paper stacking portion 235 which is an example of a first conveyance destination.

More specifically, the supply mechanism supplies the corresponding medium to the place where the insertion medium is missing in a case where each of the normal paper and the insertion medium included in the printing medium bundle PB is conveyed from the paper feeding apparatus 232 to the first paper stacking portion 235.

More specifically, the supply mechanism conveys the corresponding medium such that the corresponding medium passes through the merging portion 238 during a period after the normal paper located one before this missing place passes through the merging portion 238 (refer to FIG. 4) until the normal paper located one after this missing place passes through the merging portion 238.

More specifically, in the present exemplary embodiment, the insertion medium missing from the printing medium bundle PB (hereinafter, "missing medium") is grasped and information about the missing medium is stored in a memory (not shown), at the time of the first printing (first printing performed before the reprinting). More specifically, information such as a page number of the missing medium is stored in the memory (not shown).

In other words, in the present exemplary embodiment, information about the insertion medium for which the inspection result by the inspection apparatus 220 does not satisfy the predetermined condition and which is conveyed to the second paper stacking portion 237 is stored and held in the memory.

In the present exemplary embodiment, the information about the missing medium stored in the memory is acquired at the time of the reprinting.

In this case, the supply mechanism conveys the corresponding medium such that the corresponding medium corresponding to the missing medium passes through the merging portion 238 during a period after the normal paper located one before a place where the missing medium is required to be originally inserted passes through the merging portion 238 until the normal paper located one after the place passes through the merging portion 238.

Accordingly, the corresponding medium is supplied to the place where the insertion medium is missing in the printing medium bundle PB. In other words, the corresponding medium is supplied to the place where the missing medium is required to be originally inserted in the printing medium bundle PB.

Similarly, the supply mechanism performs the same conveyance for the normal paper for the replenishment of the normal paper missing in the printing medium bundle PB (hereinafter, referred to as "replenishment normal paper").

Specifically, as described above, the supply mechanism conveys the replenishment normal paper such that the replenishment normal paper passes through the merging portion 238 during a period after the normal paper and the insertion medium located one before the place where the normal paper is missing passes through the merging portion 238 until the normal paper and the insertion medium located one after the missing place passes through the merging portion 238.

More specifically, as described above, in the present exemplary embodiment, the normal paper missing from the printing medium bundle PB (hereinafter, "missing paper") is grasped and information about the missing paper is stored in a memory (not shown), at the time of the first printing. More specifically, information such as a page number of the missing paper is stored in the memory (not shown).

In other words, in the present exemplary embodiment, information about the normal paper for which the inspection result by the inspection apparatus 220 does not satisfy the predetermined condition and which is conveyed to the second paper stacking portion 237 is stored and held in the memory.

In the present exemplary embodiment, the information about the missing paper stored in the memory is acquired at the time of the reprinting.

In this case, the supply mechanism conveys the replenishment normal paper such that the replenishment normal paper corresponding to the missing paper passes through the merging portion 238 during a period after the normal paper and the insertion medium located one before a place where the missing paper is required to be originally inserted passes through the merging portion 238 until the normal paper and the insertion medium located one after the place passes through the merging portion 238.

Accordingly, the replenishment normal paper is supplied to the place where the normal paper is missing in the printing medium bundle PB. In other words, the replenishment normal paper is supplied to the place where the missing paper is required to be originally located in the printing medium bundle PB.

On the other hand, the supply mechanism conveys the insertion medium that is not supplied to the printing medium bundle PB from the medium accommodation portion 107B (refer to (B) of FIG. 7) to the third paper stacking portion 251 as an example of a second conveyance destination.

In other words, the supply mechanism conveys the insertion medium corresponding to the insertion medium included in the printing medium bundle PB set in the paper feeding apparatus 232 (refer to (B) of FIG. 7) to the third paper stacking portion 251.

Accordingly, in the present exemplary embodiment, the printing medium bundle PB in which the missing insertion medium and the missing normal paper are replenished is generated on the first paper stacking portion 235 (refer to (B) of FIG. 7). The insertion medium that is not replenished to the printing medium bundle PB is stacked on the third paper stacking portion 251.

Meanwhile, the insertion medium may remain in the medium accommodation portion 107B after the supply of the corresponding medium to the missing place ends.

Specifically, not all of the insertion media included in one set of the insertion medium bundles in the medium accommodation portion 107B may be used, and some insertion media may remain in the medium accommodation portion 107B.

More specifically, in the present exemplary embodiment, the insertion media are sent out in order from, for example, the insertion medium located at an upper level in one insertion medium bundle, but the insertion medium located at a lower level in this one insertion medium bundle may remain after all the supply of the insertion medium to the missing place ends.

The insertion medium remaining in the medium accommodation portion 107B may be immediately conveyed to the third paper stacking portion 251.

The present invention is not limited thereto. The remaining insertion medium may not be conveyed from the medium accommodation portion 107B until a predetermined condition is satisfied, for example.

In other words, a state may be maintained in which the remaining insertion medium is accommodated in the medium accommodation portion 107B until the predetermined condition is satisfied.

More specifically, for example, the insertion medium remaining in the medium accommodation portion 107B may not be conveyed until at least information about the printing medium bundle PB newly supported by the paper feeding apparatus 232 is obtained.

In other words, a state may be maintained in which the insertion medium remaining in the medium accommodation portion 107B is accommodated in the medium accommodation portion 107B until at least the information about the printing medium bundle PB newly supported by the paper feeding apparatus 232 is obtained.

The insertion medium remaining in the medium accommodation portion 107B may include an insertion medium that can be supplied to the printing medium bundle PB newly set in the paper feeding apparatus 232.

In other words, the insertion medium remaining in the medium accommodation portion 107B may include an insertion medium that can be supplied to the printing medium bundle PB generated by a next printing job.

As described above, in a case where the remaining insertion medium is immediately conveyed to the third paper stacking portion 251, the insertion medium that can be supplied is discarded and the insertion medium cannot be supplied to the newly set printing medium bundle PB.

On the contrary, as in the present exemplary embodiment, in a case where the state in which the remaining insertion medium is accommodated in the medium accommodation portion 107B is maintained until the information about the printing medium bundle PB newly set in the paper feeding apparatus 232 is obtained, the remaining insertion medium can be supplied to the newly set printing medium bundle PB.

More specifically, the corresponding medium can be supplied from the remaining insertion medium to the newly set printing medium bundle PB.

In the present exemplary embodiment, the paper feeding apparatus 232 is configured to support a plurality of parts of printing medium bundle PB.

In the present exemplary embodiment, a plurality of parts may be printed in one printing. In this case, the plurality of parts of printing medium bundle PB are set in the paper feeding apparatus 232.

In this case, basically, the supply mechanism sequentially supplies the corresponding media to a first part of the printing medium bundle PB from a first part of the insertion medium bundle, and sequentially supplies the corresponding media to a second part of the printing medium bundle PB from a second part of the insertion medium bundle, in performing the reprinting.

However, the present invention is not limited to this processing. The supply mechanism may supply the corresponding medium to the first part of the printing medium bundle PB from the first part of the insertion medium bundle accommodated in the medium accommodation portion 107B, and then may supply the corresponding medium to the second part of the printing medium bundle PB from the first part of the insertion medium bundle.

After the corresponding medium is supplied to the first part of the printing medium bundle PB from the first part of the insertion medium bundle, a case is assumed in which the insertion medium remains in the first part of the insertion medium bundle as shown in FIG. 8 (a diagram showing a state of the plurality of parts of insertion medium).

In this case, the supply mechanism may supply the corresponding medium to the second part of the printing medium bundle PB from the remaining insertion medium.

More specifically, there may be a case where the insertion media remaining in the medium accommodation portion 107B (insertion media configuring the first part of the insertion medium bundle) include all of the corresponding media corresponding to the insertion media missing in the second part of the printing medium bundle PB.

In this case, the supply mechanism supplies the corresponding medium to the second part of the printing medium bundle PB from the remaining insertion medium.

More specifically, for example, a case is assumed in which the insertion media missing in the second part of the printing medium bundle PB area fifteenth insertion medium and a twentieth insertion medium, for example.

Further, a case is assumed in which a thirteenth and subsequent insertion media remain as the insertion media (the insertion media configuring the first part of the insertion medium bundle) remaining in the medium accommodation portion 107B.

In this case, the supply mechanism supplies the corresponding medium corresponding to the fifteenth insertion medium and the corresponding medium corresponding to the twentieth insertion medium to the second part of the printing medium bundle PB from the remaining insertion medium.

Second Exemplary Embodiment

In the second exemplary embodiment, the CPU 210A (refer to FIG. 3) as an example of the processor outputs information about the arrangement order of the insertion media missing from the printing medium bundle PB stacked on the first paper stacking portion 235.

In the present exemplary embodiment, as described above, the printing medium bundle PB consisting of the normal paper, which is an example of the printed medium on which the printing has been performed, and the insertion medium, which is inserted between the sheets of normal paper, is stacked on the first paper stacking portion 235.

The CPU 210A outputs the information (hereinafter, referred to as "arrangement order information") about the arrangement order of the insertion media missing from the printing medium bundle PB stacked on the first paper stacking portion 235.

In the present exemplary embodiment, the output arrangement order information is displayed on the display apparatus 230 (refer to FIG. 1), for example.

FIG. 9 is a diagram describing a display on the display apparatus 230.

In this example, the display apparatus 230 displays that a green insertion medium and a blue insertion medium are missing in the printing medium bundle PB.

In this example, the display apparatus 230 displays information about the missing insertion media in order of "green insertion medium" and "blue insertion medium" from the top, and displays information about the arrangement order of each insertion medium.

More specifically, in this display example, the display apparatus 230 displays information about the arrangement order of corresponding media in a case where the user sets the corresponding media in the medium accommodation portion 107B.

In the present exemplary embodiment, the user takes out the corresponding medium corresponding to the insertion medium missing in the printing medium bundle PB from one insertion medium bundle, and then sets the corresponding medium in the medium accommodation portion 107B as indicated by a reference numeral 9A.

In the present exemplary embodiment, the display apparatus 230 displays information about the corresponding media that need to be taken out from the one insertion medium bundle and displays information about the arrangement order of the corresponding media in a case where the corresponding media are accommodated in the medium accommodation portion 107B.

Accordingly, in the present exemplary embodiment, an accommodation error in a case where the user accommodates the corresponding media in the medium accommodation portion 107B is less likely to occur.

In the present exemplary embodiment, the case where the information about the arrangement order of the corresponding media is displayed on the display apparatus 230 of the paper processing apparatus 200 will be described as an example.

Meanwhile, the information about the arrangement order of the corresponding media may be displayed on a display apparatus (not shown) provided in the image forming apparatus 100. In addition, the information about the arrangement order of the corresponding media may be output to a smartphone or tablet terminal owned by the user and displayed on these apparatuses.

In the present exemplary embodiment, the corresponding medium corresponding to the insertion medium missing from the printing medium bundle PB is set in the medium accommodation portion 107B, which is an example of the medium support portion. The corresponding medium is supplied to the printing medium bundle PB from the medium accommodation portion 107B.

In the first exemplary embodiment described above, the corresponding medium is automatically supplied to the printing medium bundle PB from the insertion medium bundle in which a set of insertion media is prepared.

On the contrary, in the present exemplary embodiment, the user selects a necessary corresponding medium from the insertion medium bundle in which the set of insertion media is prepared, and sets the selected corresponding medium in the medium accommodation portion 107B.

More specifically, in this exemplary embodiment, the user takes out the corresponding medium corresponding to the missing insertion medium from one insertion medium bundle prepared corresponding to one printing medium bundle PB, and then sets this corresponding medium in the medium accommodation portion 107B.

In this case, in the present exemplary embodiment, the information about the arrangement order of the corresponding media is displayed on the display apparatus 230.

The CPU 210A of the present exemplary embodiment outputs the information about the arrangement order of the corresponding media in the case where the user sets the corresponding medium in the medium accommodation portion 107B, and outputs the information about each color of the corresponding media as described above.

Accordingly, in the present exemplary embodiment, the information about each color of the corresponding media is also displayed, such as the "green insertion medium" and the "blue insertion medium".

Accordingly, the accommodation error in a case where the corresponding medium is accommodated in the medium accommodation portion 107B is less likely to occur as compared with a case where the information about the color is not displayed.

In addition, as the arrangement order information, for example, information about a page number of the insertion medium corresponding to the corresponding medium may be displayed on the display apparatus 230 in ascending or descending order, for example.

In this case, the information about each color of the insertion media may be also displayed together as described above.

In addition, as the arrangement order information, for example, information about a position of the corresponding medium in a case where the insertion media are counted in order from the head of the insertion medium bundle may be displayed on the display apparatus 230 in ascending or descending order.

In this case, the information about each color of the insertion media may be also displayed together as described above.

In addition, the CPU 210A may not uniformly output the arrangement order information, but may output the arrangement order information in a case where a predetermined condition is satisfied.

Specifically, for example, the CPU 210A may output the arrangement order information in a case where the position of the corresponding medium, which is taken out from the insertion medium bundle by the user, (hereinafter, "takeout medium") in the insertion medium bundle satisfies the predetermined condition.

More specifically, the CPU 210A may output the information about the arrangement order of the corresponding media, for example, in a case where the position (number) of the takeout medium is smaller than a predetermined threshold value in a case where the insertion media is counted in order from a head page of the insertion medium bundle.

The CPU 210A may output the information about the arrangement order of the corresponding media, for example, in a case where the position (number) of the takeout medium is smaller than a predetermined threshold value in a case where the insertion media is counted in order from a last page of the insertion medium bundle.

That is, the CPU 210A may output the information about the arrangement order of the corresponding media in a case where there is a situation in which the takeout medium is easily taken out from the insertion medium bundle.

In addition, the CPU 210A may output the information about the arrangement order of the corresponding media, for example, in a case where the number of corresponding media taken out from the insertion medium bundle by the user is smaller than a predetermined threshold value.

In addition, the CPU 210A may output the information about the arrangement order of the corresponding media, for example, in a case where the number of insertion media configuring the insertion medium bundle from which the corresponding media is taken out is smaller than a predetermined threshold value.

In a case where these conditions are not satisfied and the information about the arrangement order of the corresponding media is not output, the CPU 210A determines to reprint from scratch, for example.

In other words, the CPU 210A determines to perform new printing instead of performing the printing by reusing the printing medium bundle PB stacked on the first paper stacking portion 235, in the case where these conditions are not satisfied and the information about the arrangement order of the corresponding media is not output.

In this case, the CPU 210A notifies the user that the reprinting is to be performed, for example, through the display apparatus 230. In this case, the CPU 210A issues a notification to prompt the user to discard the printing medium bundle PB stacked on the first paper stacking portion 235 and discard the normal paper and the insertion medium stacked on the second paper stacking portion 237.

In this case, in a case where the user gives an instruction for the reprinting, the printing on the normal paper is performed again and the insertion medium is supplied between the sheets of normal paper from a new insertion medium bundle.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A medium processing apparatus comprising:

a first medium support tray that supports a printing medium bundle consisting of printed media on which printing has been performed and an insertion medium inserted between the printed media after a print job has been completed;

a second medium support tray supports an insertion medium bundle consisting of a plurality of the insertion media; and a supply unit including a processor configured to supply a corresponding insertion medium from the insertion medium bundle to a place where the insertion medium is missing in the printing medium bundle and does not supply an insertion medium corresponding to the insertion medium included in the printing medium bundle among the insertion media included in the insertion medium bundle to the printing medium bundle.

2. The medium processing apparatus according to claim 1, wherein the insertion medium that is not supplied to the printing medium bundle is conveyed from the second medium support tray to a place different from the printing medium bundle.

3. The medium processing apparatus according to claim 2, wherein in a case where each of the media included in the printing medium bundle is conveyed from the first medium support tray to a first conveyance destination, the corresponding insertion medium is supplied to the place where the insertion medium is missing, and the insertion medium that is not supplied to the printing medium bundle is conveyed from the second medium support tray to a second conveyance destination different from the first conveyance destination.

4. The medium processing apparatus according to claim 1, wherein the insertion medium remaining in the second medium support tray after the insertion medium is supplied to the place where the insertion medium is missing is maintained in a state of being supported by the second medium support tray without being conveyed to a place other than the second medium support tray until a predetermined condition is satisfied.

5. The medium processing apparatus according to claim 4, wherein the insertion medium remaining in the second medium support tray is maintained in a state of being supported by the second medium support tray without being conveyed to a place other than the second medium support tray at least until information about a printing medium bundle newly supported by the first medium support tray is obtained.

6. The medium processing apparatus according to claim 1, wherein the first medium support tray is configured to support a plurality of the printing medium bundles, and the process is further configured to supply the insertion medium to a first part of the printing medium bundle from the insertion medium bundle supported by the second medium support tray, and then supplies the insertion medium remaining in the second medium support tray to a second part of the printing medium bundle.

7. The medium processing apparatus according to claim 6, wherein in a case where an insertion medium corresponding to the insertion medium missing in the second part of the printing medium bundle is included in the insertion medium remaining in the second medium support tray, the process is further configured to supply the corresponding insertion medium included in the remaining insertion medium to the second part of the printing medium bundle.

8. An information processing apparatus that processes information about a medium, the apparatus comprising:

a processor configured to output information about an arrangement order of an insertion medium that is missing from a printing medium bundle consisting of printed media on which printing has been performed and the insertion medium inserted between the printed media after a print job has been completed.

9. The information processing apparatus according to claim 8, wherein a corresponding medium, which is an insertion medium corresponding to the missing insertion medium, is set in a medium support tray, and the corresponding medium is supplied to the printing medium bundle from the medium support tray, and the processor is configured to:

output information about an arrangement order of the corresponding medium in a case where a user sets the corresponding medium in the medium support tray.

10. The information processing apparatus according to claim 9, wherein the processor is configured to:

output information about the arrangement order of the corresponding medium in a case where the user sets the corresponding medium in the medium support tray and information about each color of the corresponding medium.

11. The information processing apparatus according to claim 9, wherein the corresponding medium is taken out by the user from a corresponding medium bundle in which corresponding media are bundled and then supplied to the printing medium bundle, and the processor is configured to:

output the information about the arrangement order of the corresponding medium in a case where a position of the corresponding medium, which is taken out from the corresponding medium bundle by the user, in the corresponding medium bundle satisfies a predetermined condition.

12. The information processing apparatus according to claim 9, wherein the corresponding medium is taken out by the user from a corresponding medium bundle in which corresponding media are bundled and then supplied to the printing medium bundle, and the processor is configured to:

output the information about the arrangement order of the corresponding medium in a case where the number of the corresponding media taken out from the corresponding medium bundle by the user is smaller than a predetermined threshold value.

13. A non-transitory computer readable medium storing a program executed by a computer provided in an information processing apparatus that processes information about a medium, the program causing the computer to realize a function of outputting information about an arrangement order of an insertion medium that is missing from a printing medium bundle consisting of printed media on which printing has been performed and the insertion medium inserted between the printed media after a print job has been completed.

* * * * *